US010923966B2

(12) United States Patent
Maniktala (10) Patent No.: US 10,923,966 B2
(45) Date of Patent: Feb. 16, 2021

(54) COIL STRUCTURES FOR ALIGNMENT AND INDUCTIVE WIRELESS POWER TRANSFER

(71) Applicant: ChargEdge, Inc., Fremont, CA (US)

(72) Inventor: Sanjaya Maniktala, Fremont, CA (US)

(73) Assignee: CHARGEDGE, INC., Fremont, CA (US)

(*) Notice: Subject to any disclaimer, the term of this patent is extended or adjusted under 35 U.S.C. 154(b) by 891 days.

(21) Appl. No.: 15/613,538

(22) Filed: Jun. 5, 2017

(65) Prior Publication Data
US 2017/0353061 A1  Dec. 7, 2017

Related U.S. Application Data

(60) Provisional application No. 62/345,853, filed on Jun. 5, 2016.

(51) Int. Cl.
| | |
|---|---|
| *H02J 50/90* | (2016.01) |
| *H02J 5/00* | (2016.01) |
| *G01B 7/31* | (2006.01) |
| *H01F 5/00* | (2006.01) |
| *H01F 3/00* | (2006.01) |
| *H01F 38/14* | (2006.01) |

(52) U.S. Cl.
CPC ............... *H02J 50/90* (2016.02); *G01B 7/31* (2013.01); *H01F 38/14* (2013.01); *H02J 5/005* (2013.01); *H01F 5/003* (2013.01); *H01F 2003/005* (2013.01)

(58) Field of Classification Search
None
See application file for complete search history.

(56) References Cited

U.S. PATENT DOCUMENTS

| | | |
|---|---|---|
| 6,212,430 B1 | 4/2001 | Kung |
| 9,276,437 B2 | 3/2016 | Partovi et al. |
| (Continued) | | |

FOREIGN PATENT DOCUMENTS

WO    WO2013122483 A1    8/2013

OTHER PUBLICATIONS

Wireless Power Consortium, "Qi System Description Wireless Power Transfer," vol. I: Low Power, Part 1: Interface Definition, Version 1.1.2, Jun. 2013.

(Continued)

*Primary Examiner* — Jared Fureman
*Assistant Examiner* — Aqeel H Bukhari
(74) *Attorney, Agent, or Firm* — White & Case LLP (57) ABSTRACT

In one embodiment, a coil structure for wireless power transfer comprises a ferrite core and at least two coils wound around the ferrite core, the at least two coils located symmetrically about a geometric center of the ferrite core, the at least two coils wound in such a way that when a first current flows in a first spatial direction in one of the at least two coils a second current flows in a second spatial direction in the other one of the at least two coils. In one embodiment, the coil structure is implemented in a wireless power receiver to receive power from a wireless power transmitter or to guide alignment of the receiver to the transmitter. In another embodiment, the coil structure is implemented in a wireless power transmitter to produce a magnetic field for wireless power transfer.

15 Claims, 10 Drawing Sheets

(56) References Cited

U.S. PATENT DOCUMENTS

| | | | |
|---|---|---|---|
| 2002/0024429 A1* | 2/2002 | Kamlah | G07C 9/00309 |
| | | | 340/426.1 |
| 2006/0061324 A1 | 3/2006 | Oglesbee | |
| 2009/0096413 A1 | 4/2009 | Partovi et al. | |
| 2010/0181841 A1 | 7/2010 | Azancot et al. | |
| 2010/0259217 A1 | 10/2010 | Baarman et al. | |
| 2011/0084652 A1 | 4/2011 | Julstrom et al. | |
| 2011/0115429 A1 | 5/2011 | Toivola et al. | |
| 2011/0217927 A1 | 9/2011 | Ben-Shalom et al. | |
| 2012/0154086 A1 | 6/2012 | Willemsen et al. | |
| 2013/0043734 A1 | 2/2013 | Stone et al. | |
| 2013/0093252 A1 | 4/2013 | Norconk et al. | |
| 2013/0175877 A1 | 7/2013 | Abe et al. | |
| 2013/0214591 A1 | 8/2013 | Miller et al. | |
| 2013/0249479 A1 | 9/2013 | Partovi | |
| 2013/0307468 A1 | 11/2013 | Lee et al. | |
| 2014/0070622 A1 | 3/2014 | Keeling et al. | |
| 2014/0167688 A1 | 6/2014 | Doyle et al. | |
| 2014/0232330 A1 | 8/2014 | Robertson et al. | |
| 2014/0266031 A1 | 9/2014 | Sasaki | |
| 2015/0069847 A1 | 3/2015 | Meyer et al. | |
| 2015/0091388 A1 | 4/2015 | Golko et al. | |
| 2015/0136499 A1* | 5/2015 | Ichikawa | B60L 53/122 |
| | | | 180/54.1 |
| 2015/0295416 A1 | 10/2015 | Li | |
| 2015/0372493 A1 | 12/2015 | Sankar | |
| 2017/0326991 A1* | 11/2017 | Budhia | B60L 53/12 |

OTHER PUBLICATIONS

Maniktala, S., "Fixing EMI across the Board," EE Times, Nov. 5, 2003, http://www.eetimes.com/document.asp?doc_id=1230444.

Maniktala, S., "More on Designing Reliable Electronic Ballasts," EE Times, Apr. 20, 2005, http://www.eetimes.com/document.asp?doc_id=1272231.

Maniktala, S. "The Confluence of Resonant Switching Topologies and Wireless Charging," presented at ISSCC 2015, San Francisco, CA, Feb. 26, 2015.

Maniktala, S., "WPT Breaks All Connections, Part 1," EDN Network, Mar. 9, 2015, http://www.edn.com/design/power-management/4438850/WPT-breaks-all-connections—Part-1.

Maniktala, S., "WPT Breaks All Connections, Part 2," EDN Network, Mar. 14, 2015, http://www.edn.com/design/power-management/4438924/WPT-breaks-all-connections—Part-2.

Maniktala, S., "WPT Breaks All Connections, Part 3," EDN Network, Apr. 6, 2015, http://www.edn.com/design/power-management/4439125/WPT-breaks-all-connections—Part-3.

Power Matters Alliance, "PMA Inductive Wireless Power and Charging Transmitter Specification—System Release 1," PMA-TS-0003-0 v2.00, Apr. 24, 2014.

Power Matters Alliance, "PmA Inductive Wireless Power and Charging Receiver Specification—System Release 1," PMA-TS-0001-0 v1.00, Nov. 16, 2013.

"Notification of Transmittal of the International Search Report and The Written Opinion of the International Searching Authority," Int'l Appl. No. PCT/US2016/066105, dated Feb. 7, 2017.

"Notification of Transmittal of the International Search Report and The Written Opinion of the International Searching Authority," Int'l Appl. No. PCT/US2017/020465, dated May 11, 2017.

* cited by examiner

COIL STRUCTURES FOR ALIGNMENT AND INDUCTIVE WIRELESS POWER TRANSFER

CROSS-REFERENCE TO RELATED APPLICATIONS

This application claims the benefit of U.S. Provisional Patent Application No. 62/345,853, entitled "New Coil Structures for Wireless Power Transfer," filed on Jun. 5, 2016 and U.S. Provisional Patent Application No. 62/370, 411, entitled "Wireless Power System with Multiple Dissimilar Longitudinal Coils," filed on Aug. 3, 2016. The subject matters of the related applications are hereby incorporated by reference in their entirety.

FIELD OF THE INVENTION

This invention relates generally to inductive wireless power transfer and more specifically to coil structures for alignment and inductive wireless power transfer.

BACKGROUND

Electronic devices typically require a connected (wired) power source to operate, for example, battery power or a wired connection to a direct current ("DC") or alternating current ("AC") power source. Similarly, rechargeable battery-powered electronic devices are typically charged using a wired power-supply that connects the electronic device to a DC or AC power source. The limitation of these devices is the need to directly connect the device to a power source using wires.

Wireless power transfer (WPT) involves the use of time-varying magnetic fields to wirelessly transfer power from a source to a device. Faraday's law of magnetic induction provides that if a time-varying current is applied to one coil (e.g., a transmitter coil) a voltage will be induced in a nearby second coil (e.g., a receiver coil). The voltage induced in the receiver coil can then be rectified and filtered to generate a stable DC voltage for powering an electronic device or charging a battery. The receiver coil and associated circuitry for generating a DC voltage can be connected to or included within the electronic device itself such as a smartphone.

The Wireless Power Consortium (WPC) was established in 2008 to develop the Qi inductive power standard for charging and powering electronic devices. Powermat is another well-known standard for WPT developed by the Power Matters Alliance (PMA). The Qi and Powermat near-field standards operate in the frequency band of 100-400 kHz. The problem with near-field WPT technology is that typically only 5 Watts of power can be transferred over the short distance of 2 to 5 millimeters between a power source and an electronic device, though there are ongoing efforts to increase the power. For example, some concurrently developing standards achieve this by operating at much higher frequencies, such as 6.78 MHz or 13.56 MHz. Though they are called magnetic resonance methods instead of magnetic induction, they are based on the same underlying physics of magnetic induction. There also have been some market consolidation efforts to unite into larger organizations, such as the AirFuel Alliance consisting of PMA and the Rezence standard from the Alliance For Wireless Power (A4WP), but the technical aspects have remained largely unchanged.

Due to the short range of existing WPT technology, the transmitter coil must be centered with the receiver coil connected to a device and the coils cannot be more than about 2-5 millimeters apart. This makes it difficult to implement wireless power transfer for devices that are not perfectly flat or do not have a large enough area for embedding a typical receiver coil (e.g., Android® wearable devices, Apple® watch, Fitbit® fitness tracker, etc.). The limitations of WPT also affect smartphones if the charging surface with the transmitter coil is not large enough to allow the smartphone device to sit flat on the surface (e.g., in vehicles, which typically do not have a large enough flat surface to accommodate a smartphone device). Thus, the current state of WPT technology is not suitable for many consumer or small industrial devices.

SUMMARY OF THE INVENTION

In one embodiment, a coil structure for wireless power transfer comprises a ferrite core and at least two coils wound around the ferrite core, the at least two coils located symmetrically about a geometric center of the ferrite core, the at least two coils wound in such a way that when a first current flows in a first spatial direction in one of the at least two coils a second current flows in a second spatial direction in the other one of the at least two coils. In one embodiment, the coil structure is implemented in a wireless power receiver to receive power from a wireless power transmitter or to guide alignment of the receiver to the transmitter. In another embodiment, the coil structure is implemented in a wireless power transmitter to produce a magnetic field for wireless power transfer.

In one embodiment, a coil structure for wireless power transfer comprises a ferrite core having a plurality of arms and a geometric center, and a coil wound around each of the plurality of arms of the ferrite core, the plurality of coils spaced symmetrically about the geometric center of the ferrite core. Each of the plurality of coils is wound in such a way that when a first current flows in a first spatial direction in one of the plurality of coils a second current flows in a second spatial direction in another one of the plurality of coils, where the second spatial direction is opposite to the first spatial direction.

In one embodiment, a coil structure for wireless power transfer comprises a ferrite core, at least two coils wound around the ferrite core, the at least two coils arranged symmetrically about a geometric center of the ferrite core and coupled together in series, the at least two coils wound in such a way that when a first current flows in a first spatial direction in one of the at least two coils a second current flows in a second spatial direction in the other one of the at least two coils; and a third coil wound around the ferrite core.

DETAILED DESCRIPTION

Figure 1:
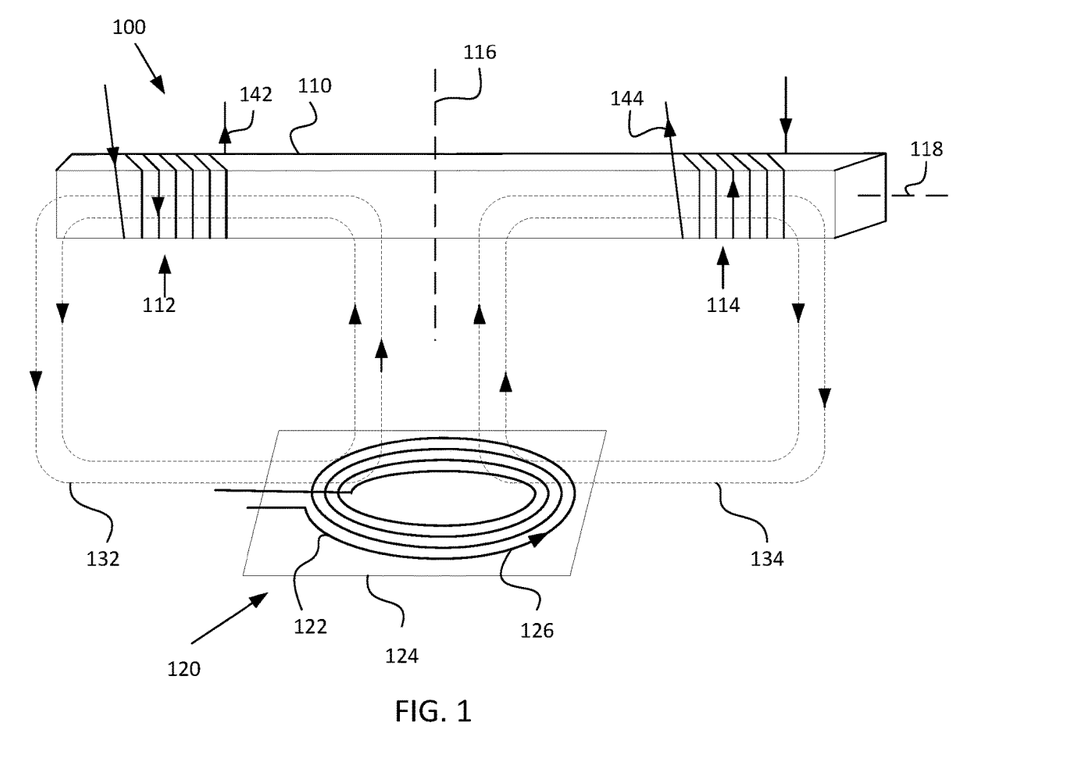
FIG. 1 is a diagram illustrating one embodiment of a coil structure for inductive wireless power transfer, according to the present invention.

FIG. 1 is a diagram illustrating one embodiment of a coil structure 100 for inductive wireless power transfer, according to the present invention. Coil structure 100 includes a ferrite core 110, a first coil 112, and a second coil 114. First coil 112 and second coil 114 have the same number of windings (turns) and are located symmetrically on either side of a geometric center axis 116 of ferrite core 110. Each of first coil 112 and second coil 114 is preferably formed of wire made from a conductive material such as copper, gold, or any other conductive material known in the art. In the FIG. 1 embodiment ferrite core 110 has a shape of a parallelepiped; other shapes such as a circular cylinder and an elliptic cylinder are within the scope of the invention. Each of first coil 112 and second coil 114 is coupled to additional components (not shown) to form a complete circuit.

A transmitter coil structure 120 produces magnetic flux that induces a current 142 in first coil 112 and a current 144 in second coil 114. Transmitter coil structure 120 includes a transmitter coil 122 and a magnetic layer 124. Magnetic layer 124 can be ferrite or any other magnetic layer known in the art. A power circuit (not shown) provides an alternating current 126 to transmitter coil 122. When current 126 is flowing in transmitter coil 122 in a counter-clockwise direction as shown in FIG. 1, transmitter coil 122 emits a magnetic field represented by magnetic flux lines 132 and 134. When the alternating current switches direction to flow in transmitter coil 122 in a clockwise direction, the magnetic field produced by transmitter coil 122 will have the opposite polarity. Faraday's law provides that the time-varying current that flows in a receiver coil will oppose the magnetic field generated by a transmitter coil. Thus, magnetic flux lines 132 passing through ferrite core 110 will induce current 142 to flow in first coil 112 and magnetic flux lines 134 passing through ferrite core 110 will induce current 144 to flow in second coil 114. First coil 112 and second coil 114 are wound around ferrite core 110 such that, as viewed along a longitudinal axis 118 of coil structure 100, when current 142 flows in first coil 112 in a counter-clockwise spatial direction, current 144 flows in second coil 114 in a clockwise spatial direction. When central axis 116 of coil structure 100 is aligned with a geometric center of transmitter coil 122, a voltage across first coil 112 will have substantially the same magnitude but opposite polarity as a voltage across second coil 114. Voltages generated by first coil 112 and second coil 114 can be used to provide power to a circuit or a storage device such as a battery, or can be used to determine alignment between a wireless power receiver and a wireless power transmitter. In one embodiment where coil structure 100 is implemented as a receiver coil only (i.e., not implemented to determine alignment), first coil 112 and second coil 114 may have different numbers of windings. In one embodiment, coil structure 100 can be implemented as a transmitter coil in a wireless power transmitter in which a power circuit applies current to first coil 112 and second coil 114 such that first coil 112 and second coil 114 generate magnetic fields.

Figure 2A:
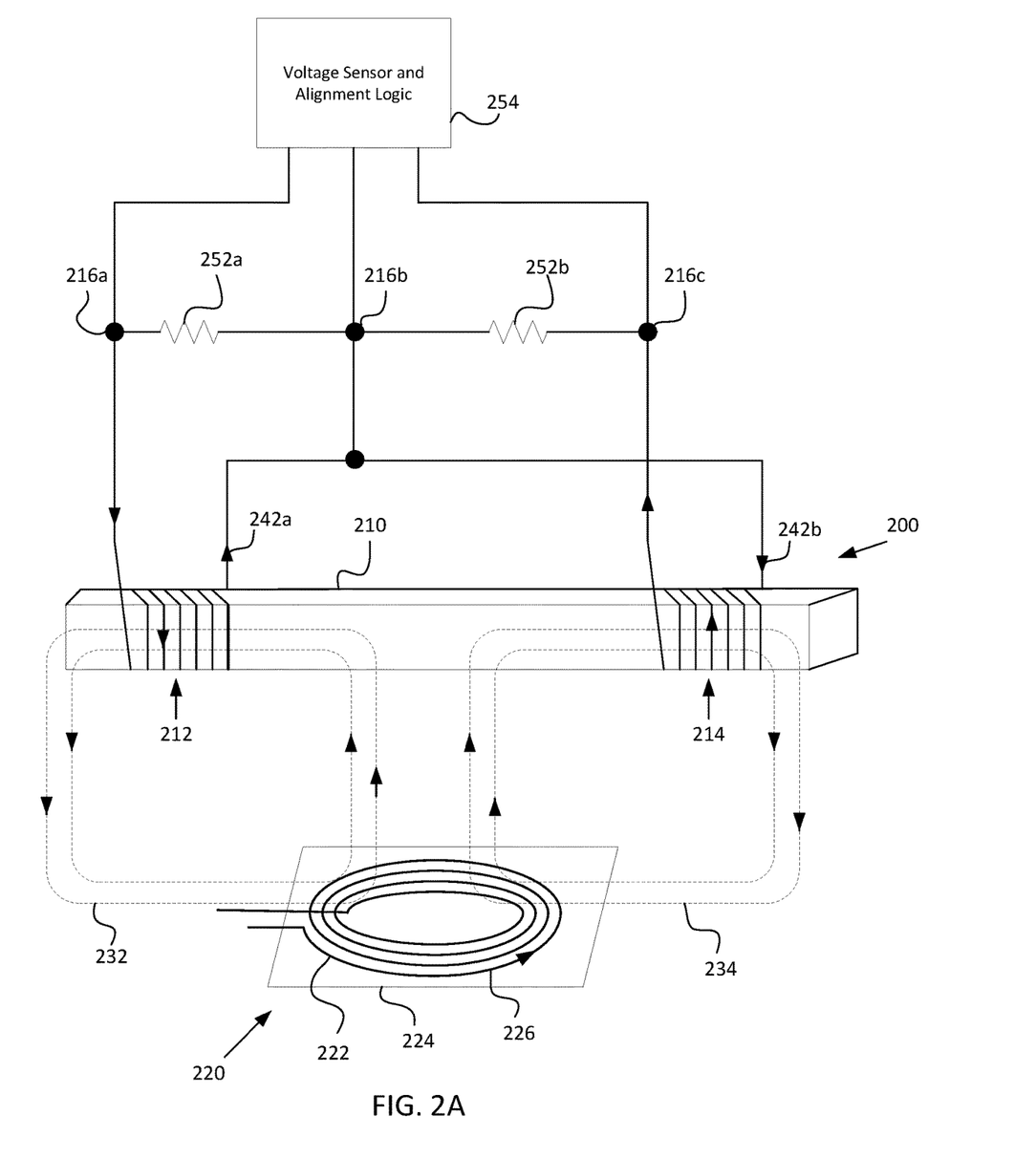
FIG. 2A is a diagram illustrating one embodiment of a coil structure as a receiver coil and an alignment guide for inductive wireless power transfer, according to the present invention.

FIG. 2A is a diagram illustrating one embodiment of a coil structure 200 as a receiver coil and an alignment guide for inductive wireless power transfer, according to the present invention. Coil structure 200 includes a ferrite core 210, a first coil 212, and a second coil 214. First coil 212 and second coil 214 have the same number of windings and are located symmetrically on either side of a geometric center axis of ferrite core 210. Each of first coil 212 and second coil 214 is preferably formed of wire made from a conductive material such as copper, gold, or any other conductive material known in the art. In the FIG. 2A embodiment, ferrite core 210 has a shape of a parallelepiped; other shapes such as a circular cylinder and an elliptic cylinder are within the scope of the invention. First coil 212 and second coil 214 are wound around ferrite core 210 such that, as viewed along a longitudinal axis of coil structure 210, when a current 242a flows in first coil 212 in a counter-clockwise spatial direction, a current 242b flows in second coil 214 in a clockwise spatial direction. First coil 212 and second coil 214 are coupled together in series, so current 242a and current 242b have the same magnitude and same electrical direction, but because of the geometries of first coil 212 and second coil 214 current 242a and current 242b have different spatial directions.

A transmitter coil structure 220 produces magnetic flux that induces current 242a in first coil 212 and current 242b in second coil 214. Transmitter coil structure 220 includes a transmitter coil 222 and a magnetic layer 224. Magnetic layer 224 can be ferrite or any other magnetic layer known in the art. A power circuit (not shown) provides an alternating current 226 to transmitter coil 222. When current 226 is flowing in transmitter coil 222 in a counter-clockwise direction as shown in FIG. 2A, transmitter coil 222 emits a magnetic field represented by magnetic flux lines 232 and 234. Faraday's law provides that the time-varying current that flows in a receiver coil will oppose the magnetic field generated by a transmitter coil. Thus, magnetic flux lines 232 passing through ferrite core 210 will induce current 242a to flow in first coil 212 and magnetic flux lines 234 passing through ferrite core 210 will induce current 242b to flow in second coil 214. When a center axis of coil structure 200 is aligned with the center of transmitter coil 222, at any given instant a voltage at a node 216c is high as compared to a voltage at a node 216b by approximately the same amount that a voltage at a node 216a is low compared to the voltage at node 216b. In other words, when coil structure 200 is aligned with the center of transmitter coil 222 the magnitude of the voltage across a resistor 252a is substantially the same as the magnitude of the voltage across a resistor 252b. A voltage sensor and alignment logic 254 senses the magnitudes of the voltages across resistors 252a and 252b. In one embodiment, when voltage sensor and alignment logic 254 senses that the magnitude of the voltage across resistor 252a is substantially equal to the magnitude of the voltage across resistor 252b or that the difference between these voltage magnitudes is below a predetermined threshold, it generates an output to trigger an auditory, visual, or other type of alert to a user that indicates receiver coil structure 200 is aligned with transmitter coil structure 220. In another embodiment, when voltage sensor and alignment logic 254 senses that the magnitude of the voltage across resistor 252s in not substantially equal to the magnitude of the voltage across resistor 252b or that the difference between these voltage magnitudes is above a predetermined threshold, it generates an output to trigger an auditory, visual, or other type of alert to a user that indicates receiver coil structure 200 is not aligned with transmitter coil structure 220. In one embodiment, each of resistors 252a and 252b has a large resistance such that each of resistors 252a and 252b draws very little current. In one embodiment, voltage sensor and alignment logic 254 also includes a receiver circuit (not shown) that rectifies and regulates the wireless power signal received by coil structure 200 from transmitter coil structure 220. In this embodiment, when coil structure 200 is aligned with the center of transmitter coil 222 the voltage at node 216b is substantially the same as the voltage at the rectified ground of the receiver circuit. In this embodiment, voltage sensor and alignment logic 254 compares the voltage at node 216b with the voltage at the rectified ground of the receiver circuit to determine whether coil structure 200 is optimally aligned.

Figure 2B:
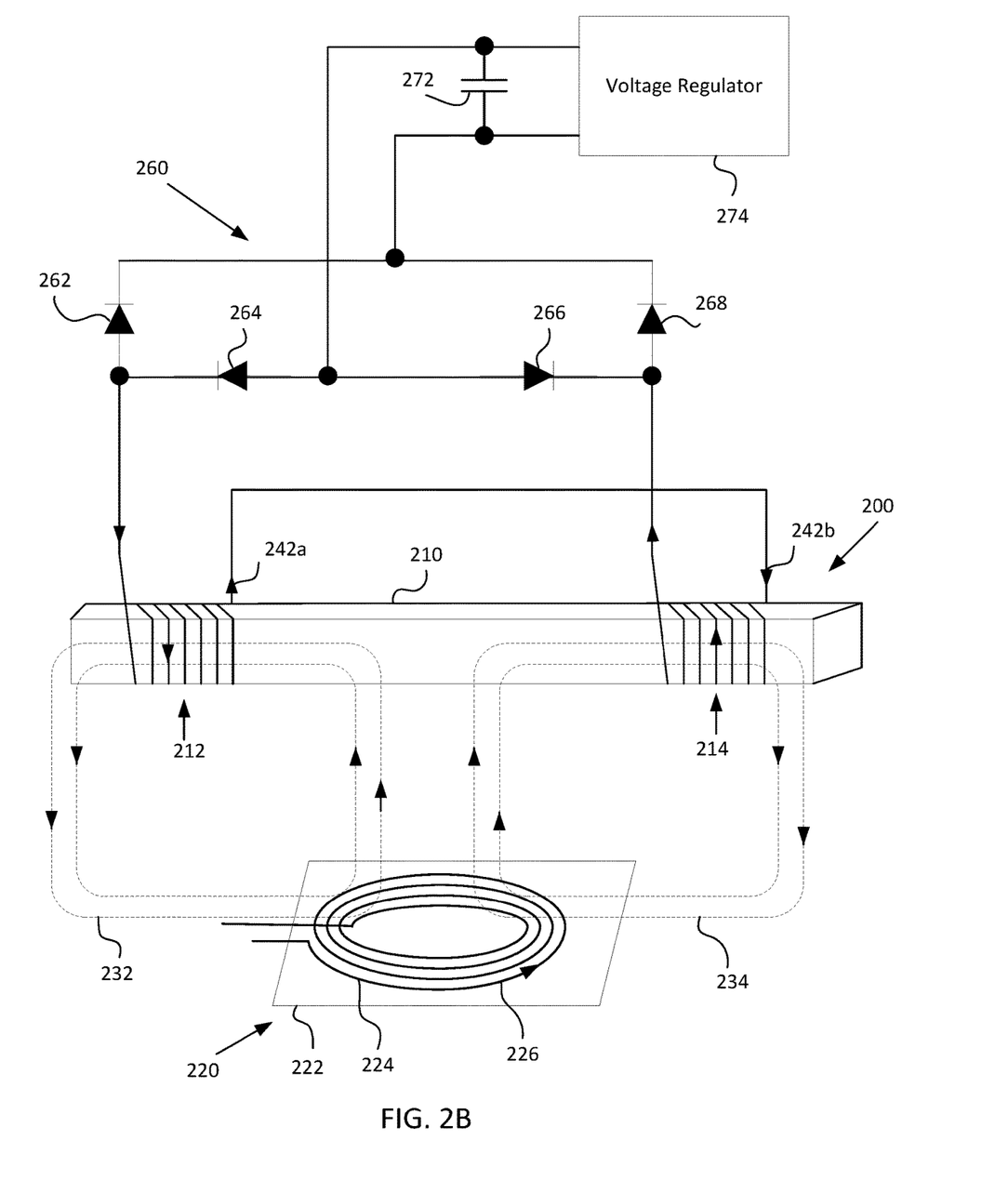
FIG. 2B is a diagram illustrating one embodiment of a coil structure as a receiver coil for inductive wireless power transfer, according to the present invention.

FIG. 2B is a diagram illustrating one embodiment of a coil structure 200 as a receiver coil for inductive wireless power transfer, according to the present invention. In the FIG. 2B embodiment, first coil 212 and second coil 214 are coupled together in series and further coupled to a rectifier bridge 260 that includes diodes 262, 264, 266, and 268. When an induced current is flowing in coil structure 200 the current is input to rectifier bridge 260, which rectifies the signal and outputs the rectified signal across a capacitor 272. Voltage regulator 274 defines an output voltage magnitude and maintains the voltage under load. The voltage generated by voltage regulator 274 can be used to charge a battery or power a device (e.g., a smart phone, laptop, drone, or any other electronic device).

Figure 2C:
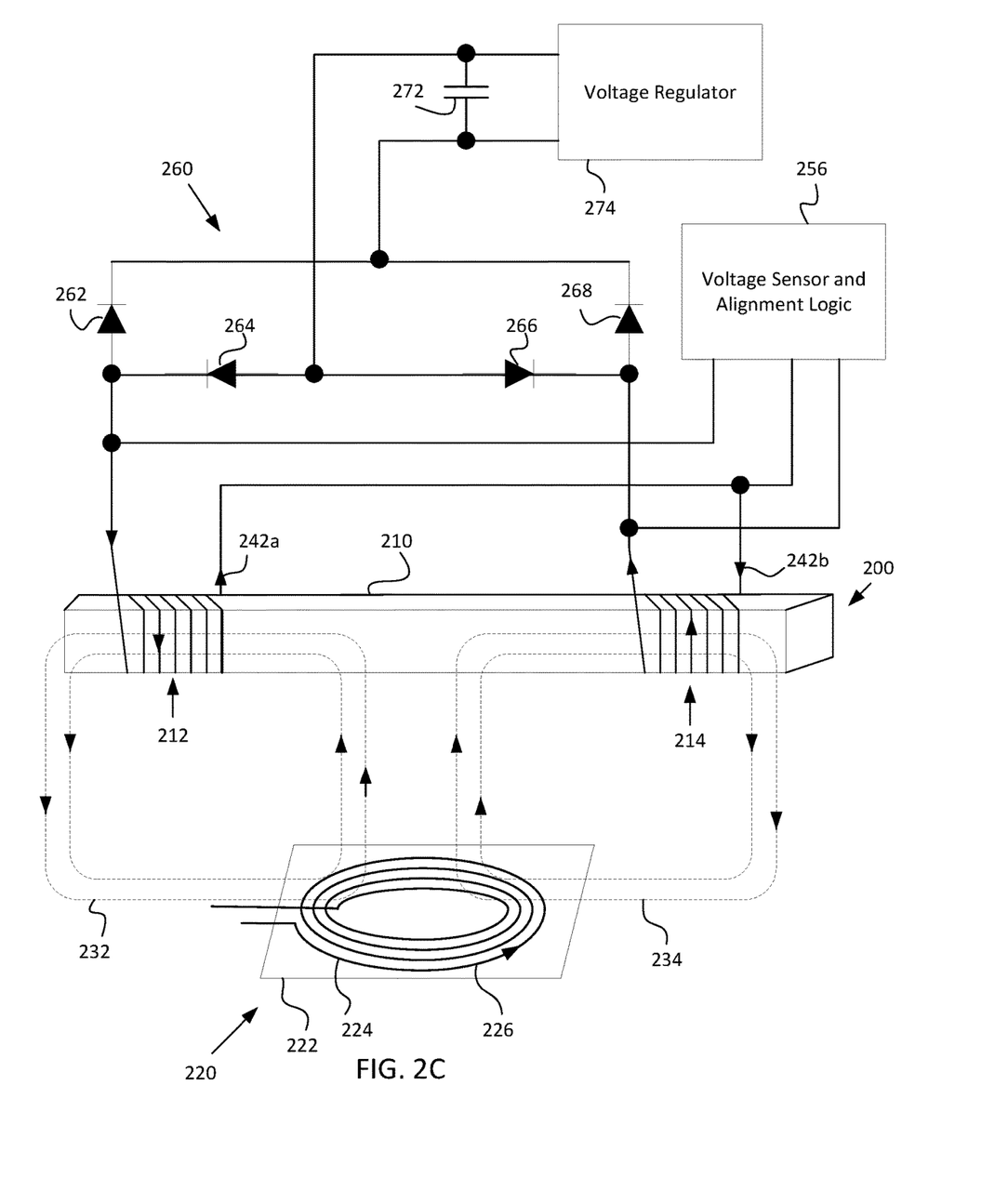
FIG. 2C is a diagram illustrating one embodiment of a coil structure as a receiver coil and an alignment guide for inductive wireless power transfer, according to the present invention.

FIG. 2C is a diagram illustrating one embodiment of a coil structure 200 as a receiver coil and an alignment guide for inductive wireless power transfer, according to the present invention. The FIG. 2C embodiment includes a voltage sensor and alignment logic 256 coupled to first coil 212 and second coil 214. Voltage sensor and alignment logic 256 senses and compares the magnitudes of voltages across first coil 212 and second coil 214. In one embodiment, when voltage sensor and alignment logic 256 senses that the magnitude of the voltage across first coil 212 is substantially equal to the magnitude of the voltage across second coil 214 or that the difference between these two voltage magnitudes is below a predetermined threshold, voltage sensor and alignment logic 256 generates an output to trigger an auditory, visual, or other type of alert to a user that indicates receiver coil structure 200 is aligned with transmitter coil structure 220. In another embodiment, when voltage sensor and alignment logic 256 senses that the magnitude of the voltage across first coil 212 is not substantially equal to the magnitude of the voltage across second coil 214 or that the difference between these two voltage magnitudes is above a predetermined threshold, voltage sensor and alignment logic 256 generates an output to trigger an auditory, visual, or other type of alert to a user that indicates receiver coil structure 200 is not aligned with transmitter coil structure 220.

Figure 3:
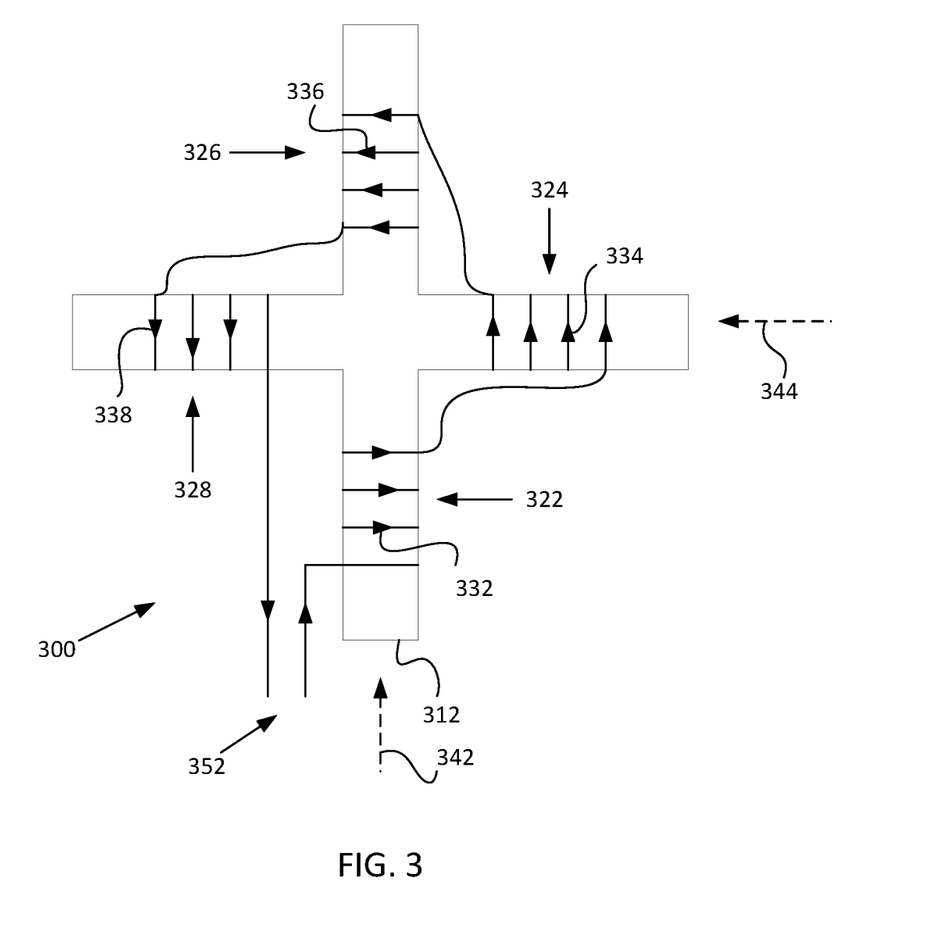
FIG. 3 is a diagram illustrating a top-down view of one embodiment of a coil structure for inductive wireless power transfer, according to the present invention.

FIG. 3 is a diagram illustrating a top-down view of one embodiment of a coil structure 300 for inductive wireless power transfer, according to the present invention. Coil structure 300 includes a ferrite core 312 in the shape of a cross with four equal arms. In one embodiment, each arm of ferrite core 312 has a square-shaped cross section; other cross-sectional shapes such as rectangular, circular, and elliptical are within the scope of the invention. Coil structure 300 further includes a first coil 322, a second coil 324, a third coil 326, and a fourth coil 328. First coil 322, second coil 324, third coil 326, and fourth coil 328 have the same number of windings and are located symmetrically around a geometrically center axis of ferrite core 312. Each of first coil 322, second coil 324, third coil 326, and fourth coil 328 is preferably formed of wire made from a conductive material such as copper, gold, or any other conductive material known in the art. First coil 322, second coil 324, third coil 326, and fourth coil 328 are wound around ferrite core 312 and coupled together in series such that, from a point of view "looking into" first coil 312 in a direction 342, when a current 332 flows in first coil 322 in a clockwise spatial direction, a current 336 flows in third coil 326 in a counter-clockwise spatial direction. Similarly, from a point of view "looking into" second coil 324 from a direction 344, when a current 334 flows in second coil 324 in a clockwise spatial direction, a current 338 flows in fourth coil 328 in a counter-clockwise spatial direction.

In one embodiment, coil structure 300 is implemented as a receiver and/or alignment coil and each of currents 332, 334, 336, and 338 flows in response to magnetic flux passing through ferrite core 312. In another embodiment, coil structure 300 is implemented as a transmitter coil and each of currents 332, 334, 336, and 338 flows in response to an alternating current applied to input 352 and each of first coil 322, second coil 324, third coil 326, and fourth coil 328 generates a magnetic field.

Figure 4:
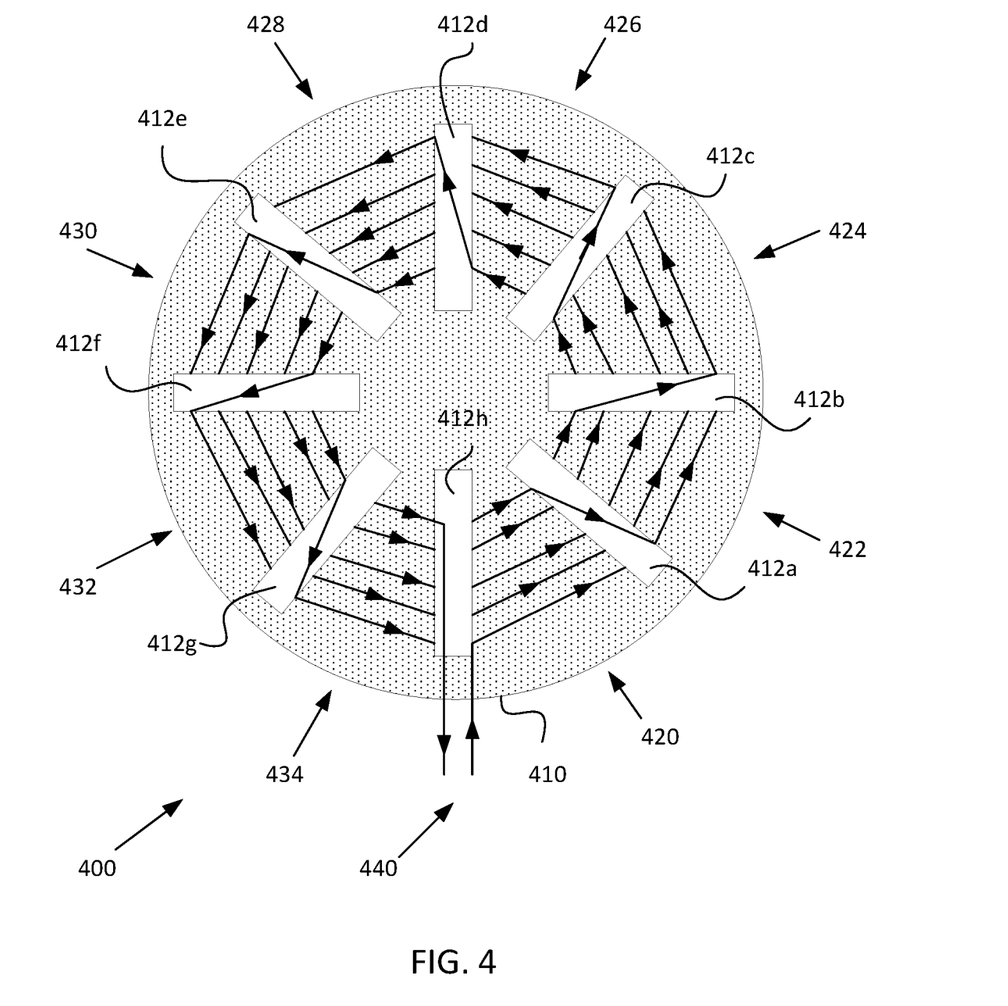
FIG. 4 is a diagram illustrating a top-down view of one embodiment of a coil structure for inductive wireless power transfer, according to the present invention.

FIG. 4 is a diagram illustrating a top-down view of one embodiment of a coil structure 400 for inductive wireless power transfer, according to the present invention. Coil structure 400 includes a ferrite core 410 and eight coils, first coil 420, second coil 422, third coil 424, fourth coil 426, fifth coil 428, sixth coil 430, seventh coil 432, and eighth coil 434, arranged symmetrically about a geometric center of ferrite core 410. In the FIG. 4 embodiment, ferrite core 412 is in the shape of a circular cylinder with a height that is preferably about 100 to 1000 times smaller than its diameter. Eight cut-out sections 412a, 412b, . . . , 412h in ferrite core 410 define eight roughly-triangular sections of ferrite core 410 around which first coil 420, second coil 422, third coil 424, fourth coil 426, fifth coil 428, sixth coil 430, seventh coil 432, and eighth coil 434 are wound. Each of first coil 420, second coil 422, third coil 424, fourth coil 426, fifth coil 428, sixth coil 430, seventh coil 432, and eighth coil 434 is preferably formed of wire made from a conductive material such as copper, gold, or any other conductive material known in the art, and have the same number of windings. Each of first coil 420, second coil 422, third coil 424, fourth coil 426, fifth coil 428, sixth coil 430, seventh coil 432, and eighth coil 434 is wound around its respective section of ferrite core 410 such that, when viewed along a longitudinal axis of a pair of opposite coils, for example first coil 420 and fifth coil 428, if a current flows in one of the coils in a clockwise spatial direction then a current flows in the opposite one of the coils in a counter-clockwise spatial direction. For example, from a point of view "looking into" first coil 420 from the outer edge of ferrite core 410, as shown in FIG. 4, when a current flows in first coil 420 in a clockwise spatial direction, a current flows in fifth coil 428 in a counter-clockwise spatial direction.

In one embodiment, coil structure 400 is implemented as a receiver and/or alignment coil and current flows in each of first coil 420, second coil 422, third coil 424, fourth coil 426, fifth coil 428, sixth coil 430, seventh coil 432, and eighth coil 434 in response to magnetic flux passing through ferrite core 410. In another embodiment, coil structure 400 is implemented as a transmitter coil and current flows first coil 420, second coil 422, third coil 424, fourth coil 426, fifth coil 428, sixth coil 430, seventh coil 432, and eighth coil 434 in response to an alternating current applied to input 440 and each of first coil 420, second coil 422, third coil 424, fourth coil 426, fifth coil 428, sixth coil 430, seventh coil 432, and eighth coil 434 generates a magnetic field.

Figure 5:
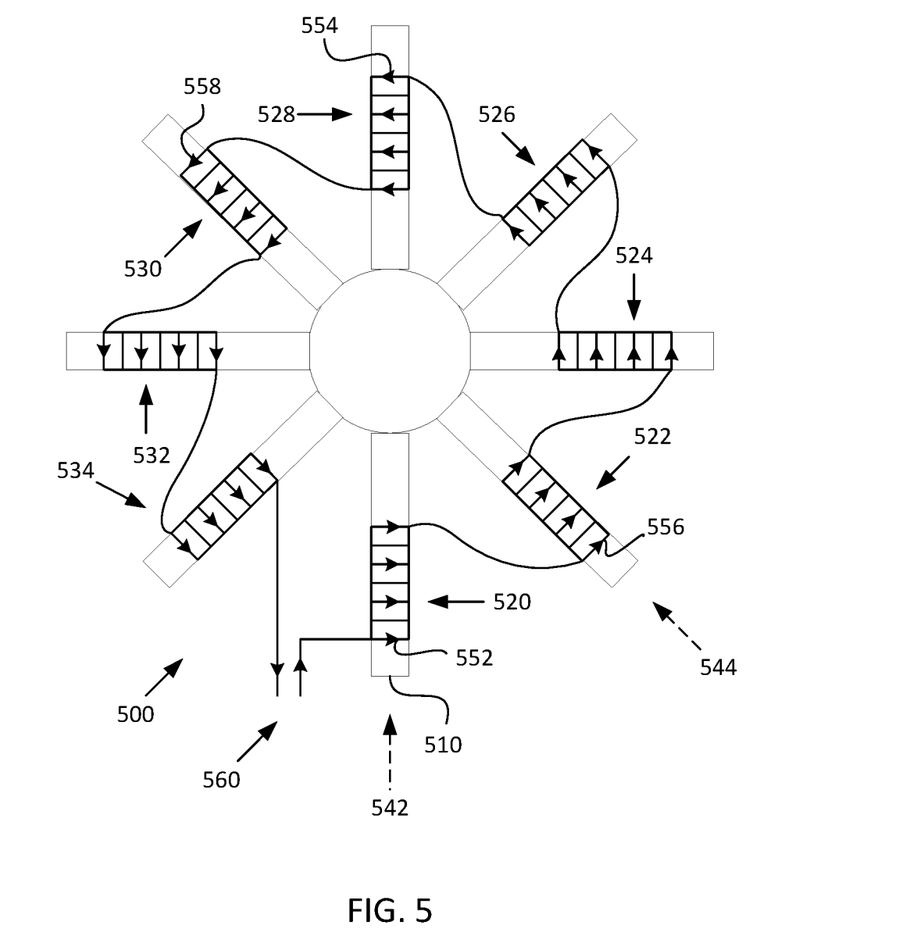
FIG. 5 is a diagram illustrating a top-down view of one embodiment of a coil structure for inductive wireless power transfer, according to the present invention.

FIG. 5 is a diagram illustrating a top-down view of one embodiment of a coil structure 500 for inductive wireless power transfer, according to the present invention. Coil structure 500 includes a ferrite core 510 in the shape of a wheel with eight spokes. In one embodiment, each spoke or arm of ferrite core 510 has a square-shaped cross section; other cross-sectional shapes such as rectangular, circular, and elliptical are within the scope of the invention. Coil structure 500 further includes a first coil 520, a second coil 522, a third coil 524, a fourth coil 526, a fifth coil 528, a sixth coil 530, a seventh coil 532, and an eighth coil 534. These eight coils of coil structure 500 have the same number of windings and are located symmetrically around a geometric center of ferrite core 510. Each of first coil 520, second coil 522, third coil 524, fourth coil 526, fifth coil 528, sixth coil 530, seventh coil 532, and eighth coil 534 is preferably formed of wire made from a conductive material such as copper, gold, or any other conductive material known in the art. First coil 520, second coil 522, third coil 524, fourth coil 526, fifth coil 528, sixth coil 530, seventh coil 532, and eighth coil 534 are wound around ferrite core 510 and coupled together in series such that, from a point of view "looking into" first coil 520 in a direction 542, when a current 5522 flows in first coil 520 in a clockwise spatial direction, a current 554 flows in fifth coil 528 in a counter-clockwise spatial direction. Similarly, from a point of view "looking into" second coil 522 from a direction 544, when a current 556 flows in second coil 522 in a clockwise spatial direction, a current 558 flows in sixth coil 530 in a counter-clockwise spatial direction.

In one embodiment, coil structure 500 is implemented as a receiver and/or alignment coil and each of currents 552, 556, 554, and 558 flows in response to magnetic flux passing through ferrite core 552. In another embodiment, coil structure 500 is implemented as a transmitter coil and each of currents 552, 556, 554, and 558 flows in response to an alternating current applied to input 560 and each of first coil 520, second coil 522, third coil 524, fourth coil 526, fifth coil 528, sixth coil 530, seventh coil 532, and eighth coil 534 generates a magnetic field.

Figure 6A:
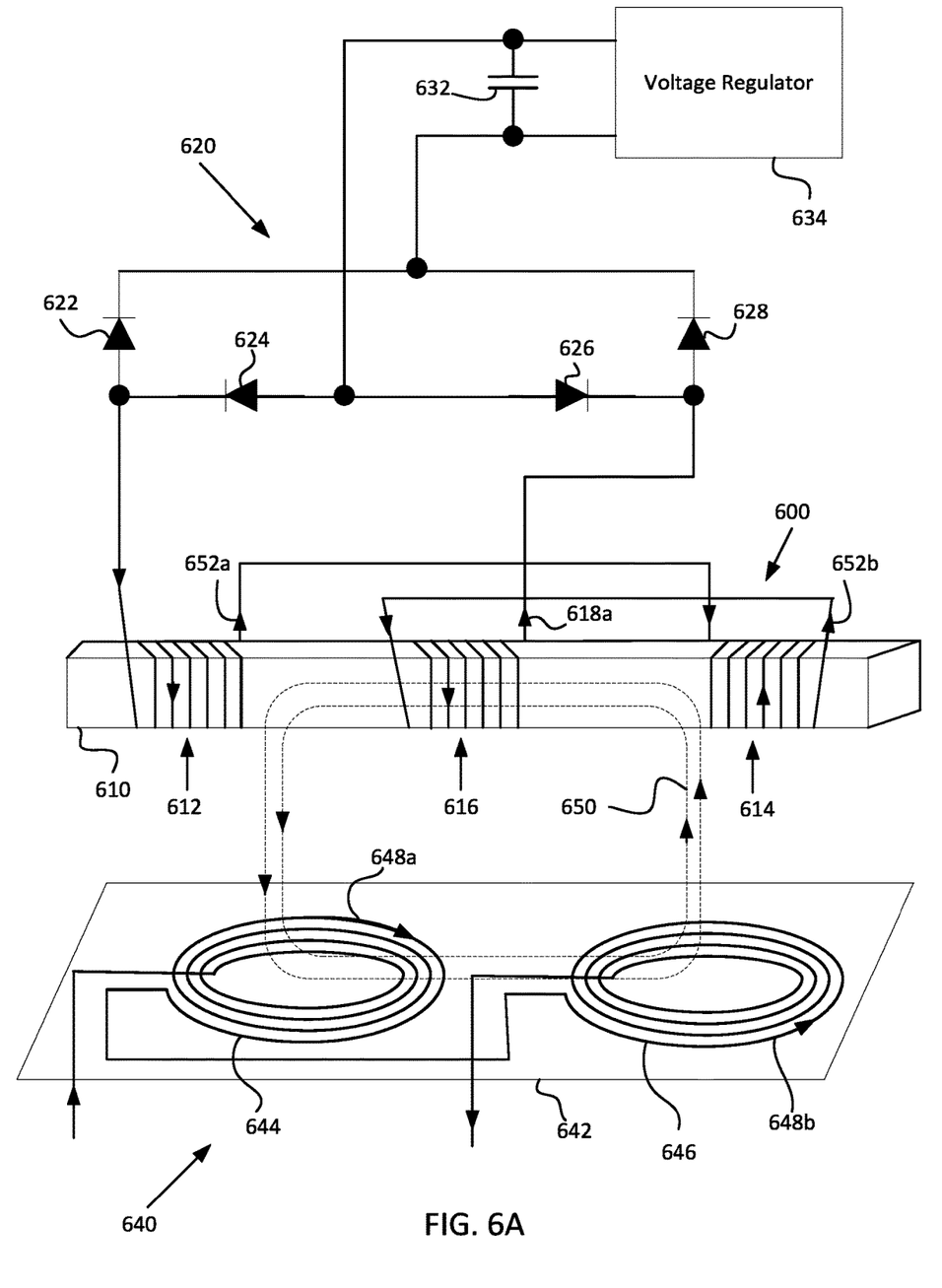
FIG. 6A is a diagram illustrating one embodiment of a coil structure as a receiver coil for inductive wireless power transfer, according to the present invention.
Figure 6B:
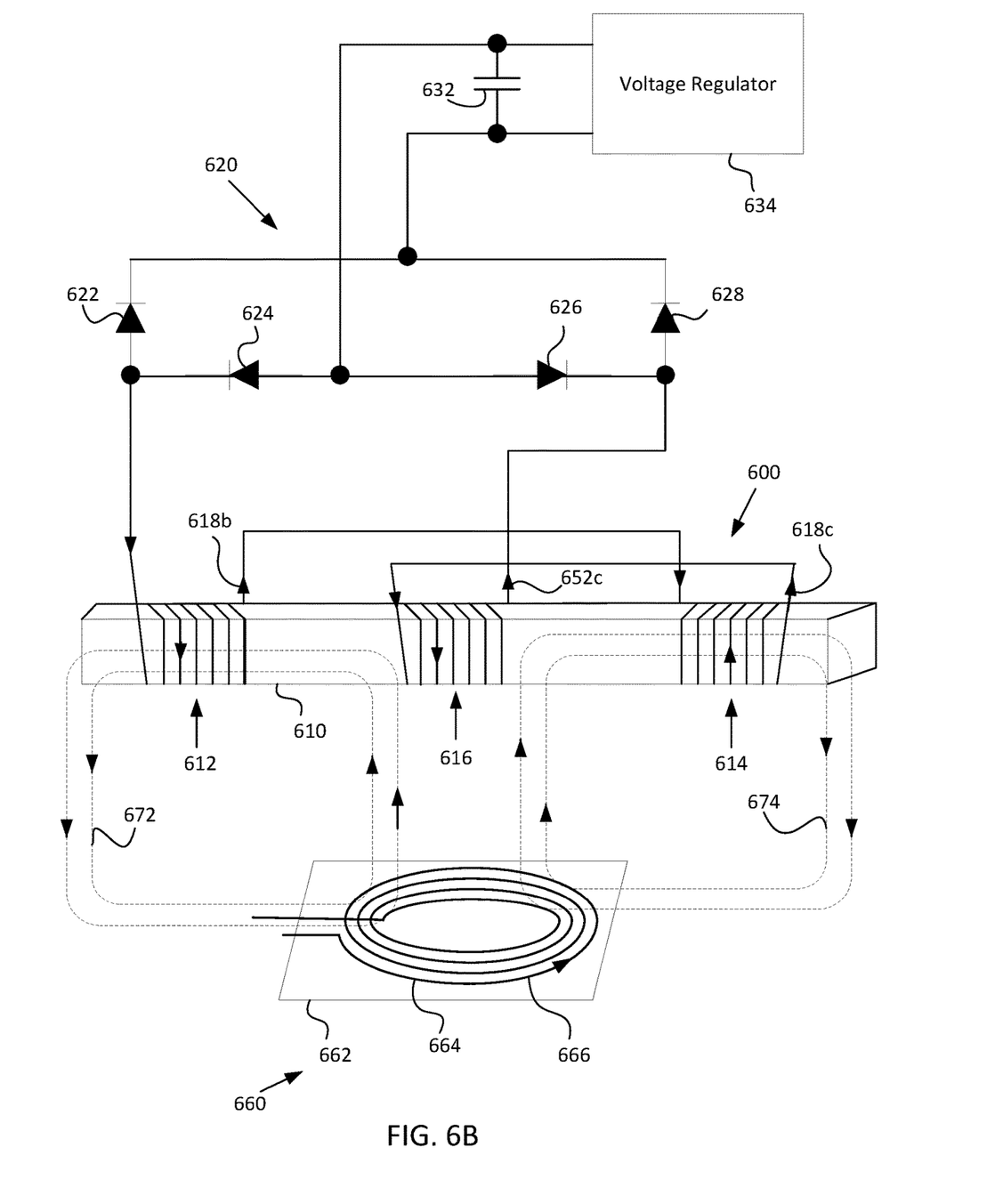
FIG. 6B is a diagram illustrating one embodiment of a coil structure as a receiver coil for inductive wireless power transfer, according to the present invention.

In one embodiment, a coil structure 600 shown in FIGS. 6A and 6B can be used as a receiver coil to receive wireless power from wireless power transmitters having different types of transmitter coil structures. FIG. 6A is a diagram illustrating one embodiment of a coil structure 600 as a receiver coil for inductive wireless power transfer, according to the present invention. Coil structure 600 includes a ferrite core 610, a first coil 612, a second coil 614, and a third coil 616. First coil 612 and second coil 614 have the same number of windings and are located symmetrically on either side of a geometric center axis of ferrite core 610. Each of first coil 612, second coil 614, and third coil 616 is preferably formed of wire made from a conductive material such as copper, gold, or any other conductive material known in the art. In the FIG. 6A embodiment, ferrite core 610 has a shape of a parallelepiped; other shapes such as a circular cylinder and an elliptic cylinder are within the scope of the invention. First coil 612 and second coil 614 are wound around ferrite core 610 such that, from a point of view along a longitudinal axis of coil structure 610, when a current 652a flows in first coil 612 in a counter-clockwise spatial direction, a current 652b flows in second coil 614 in a clockwise spatial direction. First coil 612 and second coil 614 are coupled together in series and further coupled in series with third coil 616. Although in the FIG. 6a embodiment third coil 616 is shown spaced apart from both first coil 612 and second coil 614, an embodiment of coil structure 600 where third coil 616 partially or completely overlaps first coil 612 and second coil 614 is within the scope of the invention.

A transmitter coil structure 640 includes, but is not limited to, a transmitter coil 644 and a transmitter coil 646 that are magnetically coupled together by a magnetic layer 642. Magnetic layer 642 underlies both transmitter coil 644 and transmitter coil 646. Magnetic layer 642 can be ferrite or any other magnetic layer known in the art. Transmitter coil 644 and transmitter coil 646 are preferably identical coils with the same number of turns and the same area. A power circuit (not shown) generates an AC signal that is input to transmitter coil structure 640, causing current to flow to transmitter coil 644 and then to transmitter coil 646. Transmitter coils 644 and 646 can be formed of wire or traces on a printed circuit board using conductive material such as copper, gold, or any other conductive material known in the art.

As shown in FIG. 6A, a current 648a flows through transmitter coil 644 in a clockwise direction. Transmitter coil 644 is coupled to transmitter coil 646 such that a current 648b flows through transmitter coil 646 in a counter-clockwise direction. Current 648a is equivalent in magnitude to current 648b but flows in an opposite spatial direction. Because current 648a and current 648b are flowing in opposite spatial directions at any given point in time, the magnetic field generated by current 648a is in a different direction than the magnetic field generated by current 648b (i.e., the magnetic fields have different polarity). Further, because the magnetic fields have different polarity, magnetic flux lines produced by transmitter coil 644 and magnetic flux lines produced by transmitter coil 646 magnetically couple to form closed flux lines 650. The operation and benefits of pairs of coils producing magnetic flux with opposite polarities is further disclosed in U.S. patent application Ser. No. 15/082,533, the subject matter of which is hereby incorporated by reference in its entirety.

Flux lines 650 passing through ferrite core 610 will induce a current 618a in third coil 616. Because first coil 612 and second coil 614 are coupled in series with third coil 616, each of currents 652a and 652b have a magnitude the same as the magnitude of current 618a. Third coil 616 is further coupled to a rectifier bridge 620 that includes diodes 622, 624, 626, and 628. When induced current 618s is flowing in third coil 616, current 618a is input to rectifier bridge 620, which rectifies the signal and outputs the rectified signal across a capacitor 632. The voltage across capacitor 632 is approximately equal to the voltage across first coil 612 plus the voltage across second coil 614 plus the voltage across third coil 616. Voltage regulator 634 defines an output voltage magnitude and maintains the voltage under load. The voltage generated by voltage regulator 634 can be used to charge a battery or power a device (e.g., a smart phone, laptop, drone, or any other electronic device).

FIG. 6B is a diagram illustrating one embodiment of a coil structure 600 as a receiver coil for inductive wireless power transfer, according to the present invention. In the FIG. 6B embodiment, a transmitter coil structure 660 produces magnetic flux that induces a current 618b in first coil 612 and a current 618c in second coil 614. Transmitter coil structure 660 includes a transmitter coil 664 and a magnetic layer 662. Magnetic layer 662 can be ferrite or any other magnetic layer known in the art. A power circuit (not shown) provides an alternating current 666 to transmitter coil 664. When current 666 is flowing in transmitter coil 664 in a counter-clockwise direction as shown in FIG. 6B, transmitter coil 664 emits a magnetic field represented by magnetic flux lines 672 and 674. Magnetic flux lines 672 passing through ferrite core 610 will induce current 618b to flow in first coil 612 and magnetic flux lines 674 passing through ferrite core 610 will induce current 618c to flow in second coil 614. Because third coil 616 is coupled in series with first coil 612 and second coil 614, a current 652c flowing in third coil 616 will have the same magnitude as currents 618b and 618c.

Figure 7:
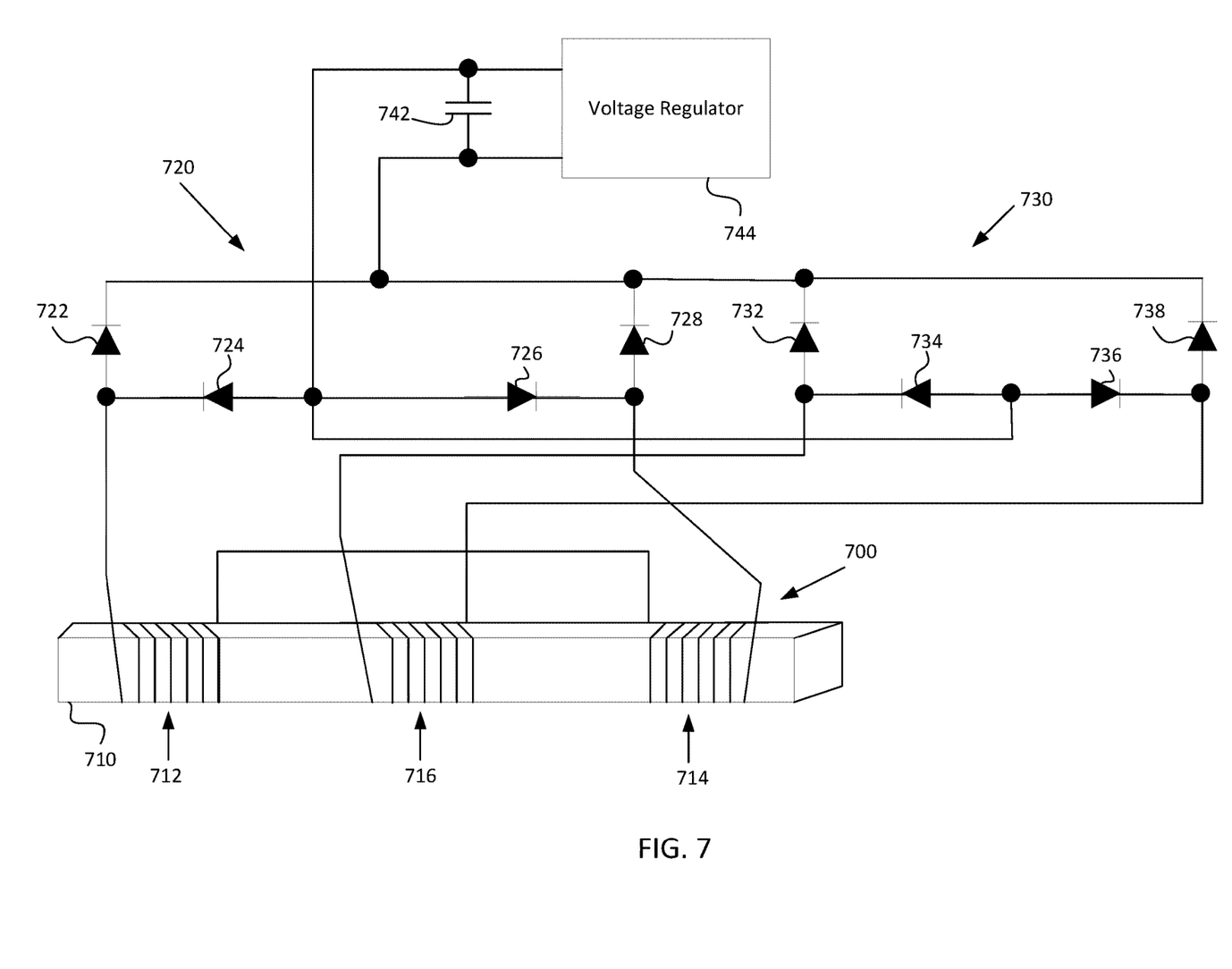
FIG. 7 is a diagram illustrating one embodiment of a coil structure as a receiver coil for inductive wireless power transfer, according to the present invention.

FIG. 7 is a diagram illustrating one embodiment of a coil structure as a receiver coil for inductive wireless power transfer, according to the present invention. Coil structure 700 includes a ferrite core 710, a first coil 712, a second coil 714, and a third coil 716. First coil 712 and second coil 714 have the same number of windings and are located symmetrically on either side of a geometric center axis of ferrite core 710. Each of first coil 712, second coil 714, and third coil 716 is preferably formed of wire made from a conductive material such as copper, gold, or any other conductive material known in the art. In the FIG. 7 embodiment, ferrite core 710 has a shape of a parallelepiped; other shapes such as a circular cylinder and an elliptic cylinder are within the scope of the invention. First coil 712 and second coil 714 are wound around ferrite core 710 such that, from a point of view along a longitudinal axis of coil structure 710, when a current flows in first coil 712 in a counter-clockwise spatial direction, a current flows in second coil 714 in a clockwise spatial direction. First coil 712 and second coil 714 are coupled together in series. Although in the FIG. 7 embodiment third coil 716 is shown spaced apart from both first coil 712 and second coil 714, an embodiment of coil structure 700 where third coil 716 partially or completely overlaps first coil 712 and second coil 714 is within the scope of the invention.

Coil 712 and coil 714 are coupled to a rectifier bridge 720 that includes diodes 722, 724, 726, and 728. When an induced current flows in coil 712 and coil 714, that current is input to rectifier bridge 720, which rectifies the signal and outputs the rectified signal across a capacitor 742. The voltage across capacitor 742 is approximately equal to the voltage across first coil 712 plus the voltage across second coil 714. Voltage regulator 744 defines an output voltage magnitude and maintains the voltage under load. The voltage generated by voltage regulator 744 can be used to charge a battery or power a device (e.g., a smart phone, laptop, drone, or any other electronic device). Coil 716 is coupled to a rectifier bridge 730 that includes diodes 732, 734, 736, and 738. When an induced current flows in coil 716, that current is input to rectifier bridge 730, which rectifies the signal and outputs the rectified signal across capacitor 742. Depending on whether coils 712 and 714 or coil 716 is receiving magnetic flux from a wireless power transmitter, either rectifier bridge 720 or rectifier bridge 730 will provide a signal to capacitor 742 and voltage regulator 744.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A coil structure for wireless power transfer comprising:
   a ferrite core; and
   at least two coils wound around the ferrite core, the at least two coils located symmetrically about a geometric center of the ferrite core,
   the at least two coils wound in such a way that when a first current flows in a first spatial direction in one of the at least two coils a second current flows in a second spatial direction in the other one of the at least two coils, the second spatial direction being opposite to the first spatial direction.

2. The coil structure of claim 1, wherein the at least two coils are coupled together in series and the first current and the second current have equal magnitudes.

3. The coil structure of claim 1, wherein the first current is induced by magnetic flux passing through the ferrite core and one of the at least two coils and the second current is induced by magnetic flux passing through the ferrite core and the other one of the at least two coils.

4. The coil structure of claim 1, wherein the ferrite core has a shape of one of a parallelepiped, a circular cylinder, and an elliptic cylinder.

5. The coil structure of claim 1, where the ferrite core comprises a plurality of arms arranged symmetrically around the geometric center of the ferrite core.

6. The coil structure of claim 1, wherein the ferrite core has a shape of a disc and comprises at least two sections around which the at least two coils are wound.

7. A coil structure for wireless power transfer comprising:
   a ferrite core having a plurality of arms and a geometric center; and
   a coil wound around each of the plurality of arms of the ferrite core, the plurality of coils spaced symmetrically about the geometric center of the ferrite core,
   wherein each of the plurality of coils is wound in such a way that when a first current flows in a first spatial direction in one of the plurality of coils a second current flows in a second spatial direction in another one of the plurality of coils, where the second spatial direction is opposite to the first spatial direction.

8. The coil structure of claim 7, wherein the plurality of coils are coupled together in series and the first current has the same magnitude as the second current.

9. The coil structure of claim 7, wherein the ferrite core has a shape of one of a parallelepiped, a circular cylinder, and an elliptic cylinder.

10. The coil structure of claim 7, where the ferrite core comprises a plurality of arms arranged symmetrically around the geometric center of the ferrite core.

11. A coil structure for wireless power transfer comprising:
   a ferrite core;
   at least two coils wound around the ferrite core, the at least two coils arranged symmetrically about a geometric center of the ferrite core and coupled together in series,
   the at least two coils wound in such a way that when a first current flows in a first spatial direction in one of the at least two coils a second current flows in a second spatial direction in the other one of the at least two coils, the second spatial direction being opposite to the first spatial direction; and a third coil wound around the ferrite core.

12. The coil structure of claim 11, wherein windings of the third coil at least partially overlap with windings of each of the at least two coils.

13. The coil structure of claim 11, wherein the third coil is coupled in series with the at least two coils.

14. The coil structure of claim 11, wherein the ferrite core has a shape of one of a parallelepiped, a circular cylinder, and an elliptic cylinder.

15. The coil structure of claim 11, where the ferrite core comprises a plurality of arms arranged symmetrically around the geometric center of the ferrite core.

* * * * *